March 26, 1968 H. VINCENT 3,374,879
SCRAPER BLADE ATTACHMENT FOR STABLE CLEANER
Filed Jan. 24, 1967
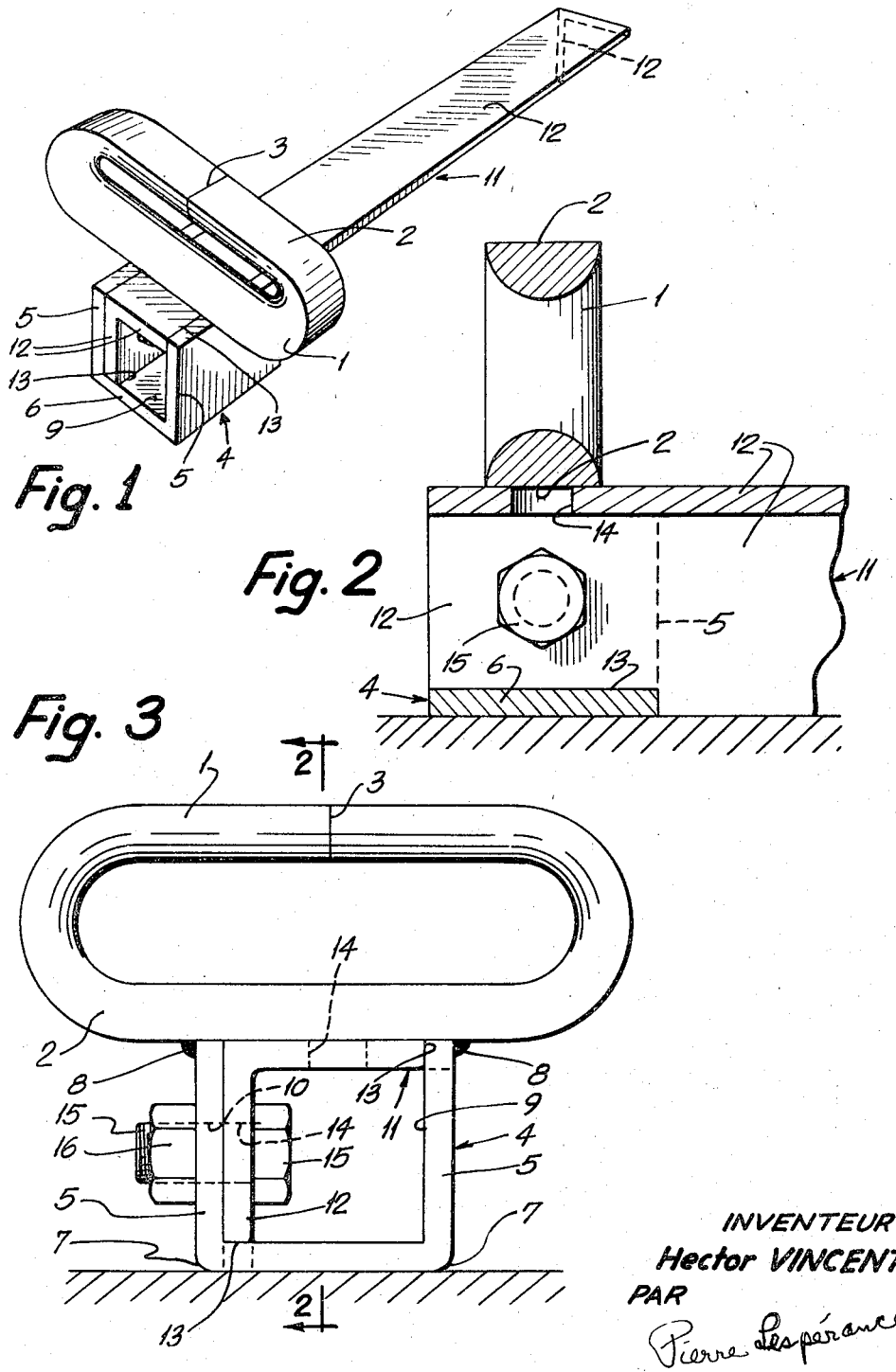
INVENTEUR
Hector VINCENT
PAR
AGENT

3,374,879
SCRAPER BLADE ATTACHMENT FOR STABLE CLEANER

Hector Vincent, St. Valerien, Quebec, Canada, assignor to La Cie Hydrolic Vincent Ltée, St. Valerien, Quebec, Canada
Filed Jan. 24, 1967, Ser. No. 611,311
7 Claims. (Cl. 198—176)

ABSTRACT OF THE DISCLOSURE

Scraper blade attachment for an endless belt.

---

The present invention relates to stable-cleaning systems of the type comprising an endless conveyor chain moved by power means in a trough, or the like, made in the floor of a stable and to which is attached a plurality of spaced transverse scraper blades which scrape the bottom of the trough and carry the manure and other waste outside the stable.

The present invention relates more particularly to means for attaching the scraper blades to the conveyor chain, the latter being described and claimed in a copending application in the United States Ser. No. 506,531, filed Nov. 5, 1965, now U.S. Patent No. 3,339,711 the inventors being Georges Lacoste, Elphège Petit, Donatien Racicot and Hector Vincent.

The general object of the present invention resides in the provision of means to attach the scraper blades to the stable conveyor chain, which is an improvement over the attaching means described in the above-noted U.S. patent application and over the attaching means and methods used in conventional stable-cleaning apparatuses.

A more specific object of the invention resides in the provision of a bracket for attaching a scraper blade to a conveyor chain of a stable-cleaning apparatus, which has a much greater wear surface than the conventional bracket and which, therefore, will resist wear to a much greater extent than conventional scraper blade attaching brackets and will prolong the useful life of the stable-cleaning apparatus.

Another object of the present invention resides in the provision of a securing system of the character described, which is of very simple and inexpensive construction and which enables to secure the scraper blades to the right or to the left of the conveyor chain.

With these objects in view, the present invention is characterized by a chain of a stable-cleaning apparatus, to spaced links of which are secured sleeve-like brackets extending underneath and transversely of the chain links, adapted to surround the end of a scraper blade inserted therein and providing a wear or shoe surface of relatively large area adapted to rest and slide on a support surface.

The foregoing and other objects of the invention will become more apparent during the following disclosure and by referring to the drawings, in which:

FIGURE 1 is a perspective view of a link of the chain of a stable-cleaning apparatus provided with the attaching bracket and a scraper blade to form the assembly in accordance with the invention;

FIGURE 2 is a cross-section taken along line 2—2 of FIGURE 3; and

FIGURE 3 is an elevation of one end of the assembly of FIGURE 1.

In the drawings, like reference characters indicate like elements throughout.

Reference numeral 1 indicates a chain link for the chain of a stable-cleaning apparatus, this chain link being made in accordance with the above-noted patent application from steel rod having a half circular cross-section forming a flat face 2 disposed exteriorly of the chain link, the steel rod being bent over itself at 180° at two spaced locations and the ends of the rod being welded together, as shown at 3.

The chain link has an elongated shape, as conventional chain links, whereby the flat faces 2 form two opposite straight zones extending longitudinally of the chain link.

The attaching bracket in accordance with the invention comprises a U-shaped element 4 constituted by two spaced parallel legs 5 and a intermediate transverse part, or bight 6, forming a shoe adapted to rest and slide on the bottom of a trough of a stable.

The element 4 is made of flat steel stock and bent in order that the legs 5 will be at right angle with respect to shoe 6 and to form rounded external corners 7 at the junction of the legs 5 with the shoe 6.

The U-shaped element 4 is welded at the free ends of its legs 5 to the flat face 2 of the chain link 1 in the straight central zone of said chain link and in planes perpendicular to the long axis or median plane of the chain link 1. The U-shaped element 4 defines with flat face 2 a through bore 9 which has a square cross-section. The bracket 4 extends equally from both sides of the median plane of link 1, as shown in FIGURE 2, and is located underneath the chain link 1.

One of the legs 5 is provided with a hole 10 in the center thereof. Alternately, the two legs 5 could be each provided with a hole 10.

The scraper blades 11 in accordance with the invention are each constituted by an angle iron, the wings 12 of which have equal width. One end of each scraper blade is provided with recesses 13 made along the external edge of each of the wings 12. These recesses 13 have a length equal to the length of the element 4 and a depth equal to the thickness of the steel plate serving to make the element 4.

The end of the angle iron scraper blade 11 provided with the recesses 13 is inserted within the through bore 9 defined by the bracket 4 and the chain link 1, in order that one of the wings 12 will rest flat on the inside surface of the leg 5 provided with hole 10, and the other of the wings 12 will rest flat against the portion of the flat face 2 of the chain link 1 which extends between the two legs 5, 9, as shown in FIGURE 3.

The recesses 13 therefore respectively receive the shoe 6 and the other leg 5 of bracket 4; the remaining portion of the free edge of the vertical wing 12 of the angle iron scraper blade 11 rests directly on the ground or, more specifically, on the bottom of the stable trough as the shoe 6 itself, and serves to scrape the bottom of the trough.

When the scraper blade 11 is fully inserted into bore 9, the shoulders defined by recesses 13 with the external edges of wings 12 abut against the edges of shoe 6 and of leg 5 respectively.

Wings 12 are provided with holes 14 in the center of the wing part having recesses 13. In the inserted position of the scraper blade within the bore 9, hole 14 made in the wing 12, which contacts leg 5, automatically comes into register with hole 10 of said leg 5, whereby a bolt 15 is inserted through the two registering holes and is fitted with a nut 16 to fully secure the scraper blade 11 to the element or bracket 4.

The position of the scraper blade with respect to the chain can be reversed such that the scraper blade will extend to left or right of the chain. For that purpose, the end of the scraper blade 11 provided with recesses 13 is inserted through the opposite end of bore 9 after the scraper blade has been rotated through 90° about its longitudinal axis, in order to apply against leg 5 provided with hole 10 the wing 12 of the scraper blade which was previously applied against face 2 of link 1. Thus, the hole 14 of said last-named wing is now in register with hole 10 of leg 5 and receives bolt 15, which is fitted with nut 16. Thus, the position of the scraper blade has been reversed with respect to the chain.

As mentioned hereinabove, the other leg 5 of bracket 4 can also be provided with a hole 10 in order to be able to reverse the direction of the horizontal wing of the scraper blade 11. For this purpose, the scraper blade is rotated through 90° about its longitudinal axis in order to use the other hole 10 of said other wing for the insertion of bolt 15.

The U-shaped bracket 4 makes a very rigid securing means for solidly attaching the scraper blade in a removable manned and, moreover, forms a shoe 6 which has large wear surface adapted to come in contact with the bottom of the trough. As this shoe 6 supports the weight of the chain, it will be appreciated that the wear on the shoe is considerably decreased with respect to the wear which takes place on the narrow edge of the conventional scraper blade attaching angle iron illustrated in the above-noted patent application.

It is noted that U-shape bracket 4 forms with its link 1 a sleeve or tubular element which is rigid and will resist deformation, even when the scraper blade or the chain strikes an obstruction which stops the chain against the action of the driving means.

While a preferred embodiment in accordance with the invention has been illustrated and described, its is understood that various modifications may be resorted to without departing from the scope of the appended claims.

What I claim is:

1. In a stable-cleaning apparatus including an endless chain made of several links and scraper blades secured to spaced links of said chain in positions transverse to said chain and under the latter, a bracket secured to each of said spaced links disposed underneath said spaced links and defining a through bore, the axis of which extends transversely of the long axis of the link, one end of the scraper blade inserted within said bore and means for rigidly and detachably securing said end of said scraper blade within said bracket, said bracket surrounding the inserted end of the scraper blade and forming a wear plate having a width greater than the thickness of said chain link and a length at least equal to the transverse dimension of the scraper blade when the latter is seen in cross-section, this wear plate having an external surface which is substantially flat and adapted to rest and slide on a support surface.

2. In a stable-cleaning apparatus as claimed in claim 1, wherein said bore has a substantially square cross-section and opens at the two ends of said bracket, said scraper blade consisting of an angle iron, the wings of which have equal width.

3. In a stable-cleaning apparatus including an endless chain made of several chain links and scraper blades secured to spaced links of said chain underneath the same and transversely of said chain, said scraper blades each consisting of an angle iron having wings of equal width means for attaching in a removable manner said scraper blades to said spaced links, said attaching means comprising U-shaped elements defining two parallel and spaced legs and an intermediate transverse part defining a shoe, said legs being rigidly secured at their free ends to said spaced chain links underneath the same, said shoe having an external flat wear surface adapted to rest and slide on a support surface, said U-shaped element together with the portion of said chain link extending between the ends of said legs forming a through bore of substantially square shape cross-section, said U-shaped element being secured to said link in a manner that the longitudinal axis of said through bore is substantially perpendicular to the median plane of said chain link, one end of said angle iron inserted within said through bore with the external face of one of the wings of said angle iron in contact with the inside face of one of the legs of said U-shaped element and the external face of the other wing of said angle iron in contact with the external face of the part of said link extending between said legs, and means for removably rigidly securing the part of said angle iron inserted within said U-shaped element.

4. In a stable-cleaning apparatus as claimed in claim 3, wherein said last-named means include bolt and nut means, the bolt means passing through registering holes made in said leg of said U-shaped element and the wing of said angle iron in contact with said leg.

5. In a stable-cleaning apparatus as claimed in claim 4, wherein each of the wings of said angle iron is provided with a hole for receiving a bolt, whereby one or the other of said wings of said angle iron can be applied against said leg of said U-shaped element provided with a hole.

6. In a stable-cleaning apparatus as claimed in claim 5, wherein the portion of said angle iron inserted within said through bore is provided with a longitudinal recess made in the free edges of said wings for receiving said shoe and said other leg of said U-shaped element respectively, whereby the external edges of said wings will be substantially level with the external face of said shoe and with the external face of said other leg of said U-shaped element respectively.

7. In a stable-cleaning apparatus as claimed in claim 3, wherein said chain links each consist of an elongated loop defined by a steel rod, of semi-circular cross-section throughout its length, with the flat face of the rod disposed exteriorly of the loop, said legs of said U-shaped element secured directly to the flat external face of said spaced links mid-way between the ends of said loop.

References Cited

UNITED STATES PATENTS 1,731,393   10/1929   Paradise  ------------ 198—175
3,124,237   4/1964   Schommer  ---------- 198—176

RICHARD E. AEGERTER, *Primary Examiner.*